United States Patent
Dubois et al.

(10) Patent No.: US 10,435,560 B2
(45) Date of Patent: Oct. 8, 2019

(54) POLYMER MODIFIED ASPHALT REACTION PRODUCTS

(71) Applicant: E I DU PONT DE NEMOURS AND COMPANY, Wilmington, DE (US)

(72) Inventors: Charles J. Dubois, Orange, TX (US); George Wyatt Prejean, Orange, TX (US)

(73) Assignee: Performance Materials NA, Inc., Midland, MI (US)

(*) Notice: Subject to any disclaimer, the term of this patent is extended or adjusted under 35 U.S.C. 154(b) by 212 days.

(21) Appl. No.: 15/195,829

(22) Filed: Jun. 28, 2016

(65) Prior Publication Data

US 2017/0002202 A1    Jan. 5, 2017

Related U.S. Application Data

(60) Provisional application No. 62/187,296, filed on Jul. 1, 2015.

(51) Int. Cl.
| | | |
|---|---|---|
| *C08L 95/00* | (2006.01) | |
| *C08L 23/08* | (2006.01) | |
| *C08K 5/09* | (2006.01) | |
| *E01C 7/18* | (2006.01) | |
| *E01C 7/35* | (2006.01) | |

(52) U.S. Cl.
CPC .............. *C08L 95/00* (2013.01); *C08K 5/09* (2013.01); *C08L 23/08* (2013.01); *C08L 23/0884* (2013.01); *C08L 2555/60* (2013.01); *C08L 2555/80* (2013.01); *E01C 7/18* (2013.01); *E01C 7/35* (2013.01)

(58) Field of Classification Search
CPC ...... C08L 23/08; C08L 95/00; C08L 23/0884; C08L 2555/60; C08L 2555/80; E01C 7/35; E01C 7/18; C08K 5/09
USPC .......................................................... 524/68
See application file for complete search history.

(56) References Cited

U.S. PATENT DOCUMENTS

| | | |
|---|---|---|
| 4,070,532 A | 1/1978 | Hammer |
| 4,145,322 A | 3/1979 | Maldonado et al. |
| 4,242,246 A | 12/1980 | Maldonado et al. |
| 4,451,598 A | 5/1984 | Decroix |
| 4,554,313 A | 11/1985 | Hagenbach et al. |
| 4,567,222 A | 1/1986 | Hagenbach et al. |
| 4,650,820 A | 3/1987 | Decroix |
| 5,306,750 A | 4/1994 | Goodrich et al. |
| 5,331,028 A | 7/1994 | Goodrich |
| 5,508,112 A | 4/1996 | Planche et al. |
| 6,087,420 A | 7/2000 | Planche et al. |
| 6,117,926 A | 9/2000 | Engber et al. |
| 6,743,838 B2 | 6/2004 | Statz et al. |
| 9,028,602 B2 | 5/2015 | Chughtai et al. |
| 2007/0027261 A1 | 2/2007 | Prejean et al. |
| 2018/0208769 A1* | 7/2018 | Prejean ............. C08L 95/00 |

FOREIGN PATENT DOCUMENTS

| | | |
|---|---|---|
| EP | 0360656 B1 | 1/1994 |
| FR | 2376188 | 7/1978 |
| FR | 2429241 | 1/1980 |
| FR | 2528439 | 12/1983 |
| WO | 2004/111130 A1 | 12/2004 |

OTHER PUBLICATIONS

Herrington P R et al: "Rheological modification of bitumen with maleic anhydride and dicarboxylic acids", Fuel, IPC Science and Technology Press, Guildford, GB, vol. 78, No. I, Jan. 1, 1999, pp. 101-110.

Baghaee Taher et al: "A review on fatigue and rutting performance of asphalt mixes", Scientific Research and Essays, Jan. 1, 2011 (Jan. 1, 2011), pp. 670-682.

U.S. Appl. No. 62/121,078, by Reynoso Gomez et al, filed Feb. 26, 2015.

European Search Report for Application No. EP16177074 dated Nov. 11, 2016.

* cited by examiner

*Primary Examiner* — Angela C Scott

(57) ABSTRACT

In a process for producing a cross-linked asphalt/polymer composition ("polymer-modified asphalt" or PMA) that comprises or is produced from asphalt and an ethylene copolymer, an anhydride is used as a promoter. The ethylene copolymer comprises copolymerized units derived from ethylene and an epoxy-containing comonomer. An improvement in asphalt properties is demonstrated without the use of an acid catalyst.

15 Claims, No Drawings

POLYMER MODIFIED ASPHALT REACTION PRODUCTS

CROSS-REFERENCE TO RELATED APPLICATION

This application claims priority under 35 U.S.C. § 119 to U.S. Provisional Appln. No. 62/187,296, filed on Jul. 1, 2015, which is incorporated herein by reference in its entirety.

FIELD OF THE INVENTION

A thermoplastic polymer blend with asphalt is useful in the road paving and roofing industries. More particularly, the reaction and resultant linking of epoxide-containing polymers to asphalt forms a polyepoxy-polymer-linked-asphalt composition using anhydrides to accelerate the reaction.

BACKGROUND OF THE INVENTION

Several patents and publications are cited in this description in order to more fully describe the state of the art to which this invention pertains. The entire disclosure of each of these patents and publications is incorporated by reference herein.

The use of bitumen in the manufacture of materials for highway and industrial applications has been known for a long time. Bitumen is the main hydrocarbon binder used in the fields of road construction and civil engineering. To be useful as a binder in these different applications, the bitumen must have certain mechanical properties, and in particular certain elastic or cohesive properties. The mechanical properties of the bituminous compositions are measured by standardized tests, such as the softening point, the penetration, and the rheological characteristics in defined traction. Asphalts are performance graded (PG) by a set of specifications developed by the U.S. federal government (Strategic Highway Research Program or SHRP). For example, PG58-34 asphalt provides good rut resistance at 58° C. and good cold cracking resistance at −34° C., as determined by standards of the American Association of State Highway Transportation Officials (AASHTO).

In general, the conventional bitumens do not have all of the qualities required for use in road construction according to current standards. Therefore, various polymers have been added to the conventional bitumens to modify their mechanical properties and to form bitumen-polymer compositions having improved mechanical qualities compared with those of the bitumens alone.

Asphalt sold for paving may be modified with polymers to improve rut resistance, fatigue resistance, and cracking resistance. In addition, polymer modification may decrease the stripping from aggregate that results from increases in asphalt elasticity and stiffness. Further, the addition of polymer to asphalt provides higher temperature rut resistance and also improves fatigue resistance. Good low-temperature properties, such as penetration index, are to a large extent dependent on the specific asphalt composition (e.g., flux oil content); however, the polymer type does influence low temperature performance.

The asphalt industry classifies polymers for asphalt modification as elastomers or plastomers. Generally, elastomeric polymers improve low-temperature performance and plastomeric polymers cause deterioration in low-temperature performance. The word "plastomer" indicates a lack of elastomeric properties. Plastomers are sometimes used to modify asphalt because they can increase stiffness and viscosity, which improves rut resistance. They are generally considered inferior to elastomers, however, due to lack of significant improvements in fatigue resistance, creep resistance, cold crack resistance, etc. Styrene/butadiene/styrene block copolymers (SBS) are considered to be elastomers, as are ethylene/butyl acrylate/glycidyl methacrylate terpolymer (EnBAGMA) and ethylene/vinyl ester/glycidyl methacrylate terpolymer (EEGMA) resins, both available from E. I. du Pont de Nemours and Company of Wilmington, Del., USA ("DuPont") under the trademark Elvaloy® RET. Polyethylene (PE) and ethylene vinyl acetate (EVA) resins are considered plastomers. Polyethylene does not form a stable solution with asphalt; therefore, polyethylene-modified asphalt must be continuously stirred to prevent separation. Further, polyethylene-modified asphalt must be prepared at the mix plant and cannot be shipped due to separation. Polyethylene therefore acts as filler and does not meaningfully increase the softening point of asphalt.

Among the polymers typically added to bitumens, random or block copolymers of an aromatic monovinyl hydrocarbon and a conjugated diene and in particular copolymers of styrene and butadiene (SBS) or of styrene and isoprene are particularly effective. They dissolve very easily in most bitumens and confer excellent mechanical and dynamic properties, in particular very good viscoelastic properties. U.S. Pat. No. 6,087,420 describes a method for producing bitumen/polymer compositions comprising at least one styrene-butadiene copolymer.

The use of other polymers as additives to asphalt (bitumen) is also known in the art. See, for example, U.S. Pat. Nos. 4,650,820 and 4,451,598, which describe bitumen mixed with terpolymers derived from ethylene, an alkyl acrylate and maleic anhydride.

Also see for example U.S. Pat. Nos. 5,306,750; 6,117,926; and 6,743,838; and U.S. Patent Application Publication No. 2007/0027261, which describe bitumen mixed and reacted with epoxy-functionalized, particularly glycidyl-containing, ethylene terpolymers and, preferably (as described in U.S. Pat. No. 6,117,926), with a catalyst to accelerate the rate of reaction and lower cost of the modified system. Consistently with these descriptions, DuPont Elvaloy® RET resins (EnBAGMA and EEGMA) are excellent modifiers for asphalt and improve asphalt performance at concentrations as low as 1 to 2 weight %.

Without wising to be held to hypothesis, it is believed that the improvement in asphalt properties with addition of Elvaloy® RET at such low concentrations is due to a chemical reaction between the Elvaloy® RET and the functionalized polar fraction of asphalt ("asphaltenes").

U.S. Pat. No. 5,331,028 describes blends of asphalt with a combination of glycidyl-containing ethylene copolymer and a styrene-conjugated diene block copolymer.

U.S. Pat. No. 9,028,602 describes a bituminous composition comprising a bitumen in an amount ranging from 20 to 90 weight %, a carboxylic additive in an amount of from 0.25 to 5 weight %, and sulfur in an amount of 5 to 75 weight %, all percentages based on the weight of bitumen, carboxylic additive and sulfur, wherein the carboxylic additive is selected from carboxylic acids, carboxylic esters and carboxylic anhydrides.

Combining asphalt with elastomers such as EnBAGMA and EEGMA requires significant mixing at elevated temperatures to achieve the benefits of their addition. EnBAGMA and EEGMA are presented in pellet form and are added with stirring to hot asphalt, so that the pellets soften and melt.

The reaction between the polymer and the bitumen occurs with heat alone; however, acids such as superphosphoric acid (SPA) or polyphosphoric acid (PPA) are sometimes added to reduce the reaction time. Addition of acid can be viewed negatively in some cases, however. For example, in some jurisdictions the use of acid to accelerate mixing of polymers with asphalt is discouraged or even prohibited. In addition, some PMA producers believe that acid degrades the asphalt's properties or that acid is incompatible with amine based materials, such as the ones used as anti-stripping agents. Common anti-stripping agents include polyamines such as tetraethylenepentamine (TEPA) and bishexamethylenetriamine (BHMT); fatty amines; and amidoamines derived from fatty acids which in turn are derived from natural oils such as coconut oil and tall oil.

The reaction between the Elvaloy® RET and the asphaltenes does occur with heat alone, although the rate is lower (about 6 to 24 hours without acid and about 3 to 6 hours with acid). In addition, asphalt modified with Elvaloy® RET in the absence of SPA is less elastic than asphalt modified with Elvaloy® RET in the presence of SPA, as evidenced by a higher phase angle and lower elastic recovery. Some PMA producers prefer acid catalysis and some prefer to use heat alone. Driving the modification reaction kinetics with heat alone does eliminate the problem with amine-based anti-strippping agents, however.

It is also known that the stability of the bitumen/polymer compositions can be improved by chemical coupling of the polymer with the bitumen, this improvement moreover making it possible to extend the field of use of the bitumen-polymer compositions. The chemical coupling of the polymer with the bitumen may be accomplished, for example, by cross-linking the polymer using a cross-linking agent, such as a sulfur-donor compound.

The cross-linking of the bitumen/polymer compositions confers upon them very good properties in terms of storage stability, cohesion, elongation capacity, and resistance to aging.

For example, bitumen-polymer compositions for which a random or block copolymer of styrene and a conjugated diene such as butadiene or isoprene is coupled with the bitumen can be prepared using the processes described in the publications FR-A-2376188, FR-A-2429241, FR-A-2528439 and EP-A-0360656. In these processes, the source of sulfur consists of chemically non-bound sulfur (FR-A-2376188 and FR-A-2429241), in a polysulfide (FR-A-2528439) or in a sulfur-donor vulcanization accelerator used alone or in combination with chemically non-bound sulfur and/or a polysulfide or a non-sulfur-donor vulcanization accelerator (EP-A-0360656).

In addition to the sulfur-based crosslinking agents, sulfur in the asphalt or bitumen compositions can arise from two natural sources. First, asphalt is produced in the refinery process by removing the higher value components such as gasoline, oils and light ends from crude oil. Contaminants such as sulfur and sulfur components are concentrated in the refinery bottoms from which the bitumen is derived. Consequently, depending on the source of the crude oil, the resulting asphalt may include crudes and refinery bottoms with high levels of sulfur and sulfur components. Second, the viscosity of asphalt is high. Therefore, it is typically stored at temperatures over 140° C., conditions that can promote further thermal cracking of sulfur-containing compounds.

The presence of sulfur, however, whether as a result of the crude oil composition, the asphalt storage conditions, or the use of sulfur-donor cross-linking agents, leads to significant emission of hydrogen sulfide ($H_2S$) during PMA production and storage. Hydrogen sulfide is a colorless and toxic gas, having a characteristic odor at a very low concentration. Asphalts may exhibit high levels of $H_2S$, often exceeding 20,000 ppm. In PMA production units, the concentration of $H_2S$ released during the manufacture of a cross-linked bitumen-polymer composition is particularly significant. The release of $H_2S$ is much greater for the cross-linked bitumen-polymer compositions than for bitumen bases devoid of cross-linking agent. The use of acid to accelerate the mixing of the polymer modifiers with the asphalt can also significantly increase the release of $H_2S$. For reasons of safety and because of environmental constraints, the reduction or even the elimination of $H_2S$ emissions during the production of PMA constitutes a crucial industrial challenge.

For at least the foregoing reasons, it remains desirable to prepare polymer-modified asphalt compositions without using acid to accelerate the blending process.

SUMMARY OF THE INVENTION

Accordingly, provided herein is a polyepoxy-polymer-linked-asphalt composition (particularly for use in paving applications) comprising
  (a) asphalt in about 89 to about 99.4 weight weight %, based on the total weight of component (a), component (b) and component (c);
  (b) about 0.5 to about 10 weight %, based on the total weight of component (a), component (b) and component (c), of an E/X/Y/Z epoxy-functionalized ethylene copolymer, wherein E is the copolymerized repeat unit —($CH_2CH_2$)— derived from ethylene; X is the copolymerized repeat unit —($CH_2CR^1R^2$)—, where $R^1$ is hydrogen, methyl, or ethyl, and $R^2$ is carboalkoxy, acyloxy, or alkoxy of 1 to 10 carbon atoms (X for example is derived from alkyl acrylates, alkyl methacrylates, vinyl esters, and alkyl vinyl ethers), present in from 0 to about 40 weight % of the copolymer; Y is the copolymerized repeat unit —($CH_2CR^3R^4$)—, where $R^3$ is hydrogen or methyl and $R^4$ is carboglycidoxy or glycidoxy (Y for example is derived from glycidyl acrylate, glycidyl methacrylate, or glycidyl vinyl ether) present in from 0.3 to 15 weight % of the copolymer; and Z is the copolymerized repeat unit derived from additional comonomers including carbon monoxide, sulfur dioxide, acrylonitrile, or other monomers, present in from 0 to about 10 weight % of the copolymer; and
  (c) about 0.1 to about 1 weight %, based on the total weight of component (a), component (b) and component (c), of an anhydride.

Further provided is a method for preparing a polymer-modified asphalt, the method comprising:
  (1) providing an epoxy-functionalized ethylene copolymer or terpolymer comprising copolymerized units of ethylene and copolymerized units of an epoxy-containing comonomer;
  (2) providing an anhydride; and
  (3) heating and mixing the polymer and the anhydride with asphalt.

Notably, neither the composition nor the method includes inorganic acids such as polyphosphoric acid.

DETAILED DESCRIPTION OF THE INVENTION

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Further, unless expressly stated to the contrary, the term "or" as used herein refers to an "inclusive or" and not to an "exclusive or." For example, a condition "A or B" is satisfied by any one of the following: A is true (or present) and B is false (or not present); A is false (or not present) and B is true (or present); and both A and B are true (or present). As used herein, the terms "a" and "an" include the concepts of "at least one" and "one or more than one". The word(s) following the verb "is" can be a definition of the subject.

The term "consisting essentially of" in relation to compositions is to indicate that substantially (greater than 95 weight % or greater than 99 weight %) the only polymer(s) present in a composition is the polymer(s) recited. Thus this term does not exclude the presence of impurities or additives, e.g. conventional additives. Moreover, such additives may possibly be added via a master batch that may include other polymers as carriers, so that minor amounts (less than 5 weight % or less than 1 weight %) of polymers other than those recited may be present. Any such minor amounts of these materials do not change the basic and novel characteristics of the composition.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such.

Unless stated otherwise, all percentages, parts, ratios, etc., are by weight.

Further, when an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range. When a component is indicated as present in a range starting from 0, such component is an optional component (i.e., it may or may not be present). When present, an optional component may be present at a level of at least 0.1 weight % of the composition or copolymer, unless present at specified lower amounts. Finally, when the term "about" is used in describing a value or an end-point of a range, the disclosure should be understood to include the specific value or end-point referred to.

When materials, methods, or machinery are described herein with the term "known to those of skill in the art", "conventional" or a synonymous word or phrase, the term signifies that materials, methods, and machinery that are conventional at the time of filing the present application are encompassed by this description. Also encompassed are materials, methods, and machinery that are not presently conventional, but that may have become recognized in the art as suitable for a similar purpose.

As used herein, the term "copolymer" refers to polymers comprising copolymerized units resulting from copolymerization of two or more comonomers. In this connection, a copolymer may be described herein with reference to its constituent comonomers or to the amounts of its constituent comonomers, for example "a copolymer comprising ethylene and 15 weight % of acrylic acid", or a similar description. Such a description may be considered informal in that it does not refer to the comonomers as copolymerized units; in that it does not include a conventional nomenclature for the copolymer, for example International Union of Pure and Applied Chemistry (IUPAC) nomenclature; in that it does not use product-by-process terminology; or for another reason. As used herein, however, a description of a copolymer with reference to its constituent comonomers or to the amounts of its constituent comonomers means that the copolymer contains copolymerized units (in the specified amounts when specified) of the specified comonomers. It follows as a corollary that a copolymer is not the product of a reaction mixture containing given comonomers in given amounts, unless expressly stated in limited circumstances to be such.

Polymers having more than two types of monomers, such as terpolymers, are also included within the term "copolymer" as used herein. A dipolymer consists essentially of two copolymerized comonomers and a terpolymer consists essentially of three copolymerized comonomers. The term "consisting essentially of" in reference to copolymerized comonomers allows for the presence of minor amounts (i.e. no more than 0.5 weight %) of non-recited copolymerized units, for example arising from impurities present in the commoner feedstock or from decomposition of comonomers during polymerization.

The term "(meth)acrylate" as used herein refers to methacrylate or acrylate. For example, the term "alkyl (meth)acrylate" refers to alkyl acrylate or alkyl methacrylate.

It has now surprisingly been discovered that anhydrides accelerate the reaction and resultant linking of epoxide-containing polymers to asphalt forming a polyepoxy-polymer-linked-asphalt composition. Each of the components of the polyepoxy-polymer-linked-asphalt composition is described in detail below. The polymer-modified asphalts described herein have improved high temperature resistance and improved high elasticity at ambient and low temperatures, as well as good toughness and tenacity values, without the use of inorganic acids such as polyphosphoric acid.

Asphalt or Bitumen

The polyepoxy-polymer-linked-asphalt composition includes at least one asphalt or bitumen. The terms "asphalt" and "bitumen" are synonymous and used interchangeably in the industry and herein to refer to the naturally-derived component of viscous binding compositions used for paving and roofing applications. "Bitumen" typically refers to the primarily hydrocarbon base material that is mixed with other components. "Asphalt" may refer to the hydrocarbon base material and may also be used to refer to the final composition, including additives and aggregates, as described below. In the remainder of the description, for reasons of simplicity, the term "polymer-modified asphalt" and the acronym "PMA" will be used to refer to a polymer modified composition comprising bitumen or asphalt and to a polymer modified composition that comprises bitumen or asphalt and that is cross-linked.

The bitumen or asphalt base used in the invention comprises one bitumen, or two or more bitumens of different origins. Representative sources for asphalts and bitumens include native rock, lake asphalts, petroleum asphalts, air-blown asphalts, cracked or residual asphalts. Bitumens and asphalts may be of natural origin, such as those contained in deposits of natural bitumen, natural asphalt or bituminous sands.

Asphalt is more commonly obtained as a residue in the distillation or refining of petroleum, such as from vacuum tower bottoms (VTB). All types of asphalts and bitumens, including natural and synthetic materials, are suitable for use in the polyepoxy-polymer-linked-asphalt composition described herein. Bitumens may be optionally blown, visbroken and/or deasphalted. The bitumens may be hard grade or soft grade materials. Different bitumens may be combined with each other to obtain an improved or optimal profile of end-use properties.

Chemically, asphalt is a complex mixture that can be separated into two major fractions of hydrocarbons, asphaltenes and maltenes. The asphaltenes are polycyclic aromatics and most contain polar functionality. One or more of the following functionalities are present: carboxylic acids, amines, sulfides, sulfoxides, sulfones, sulfonic acids, porphyrins, porphyrin derivatives, metalloporphyrins or metalloporphyrin derivatives comprising cations of vanadium, nickel or iron. The maltene phase contains polar aromatics, aromatics, and naphthene. It is generally believed that asphalt is a colloidal dispersion with the asphaltenes dispersed in the maltenes, and that the polar aromatics function as dispersing agents. The asphaltenes are relatively high in molecular weight (about 1500 daltons), compared with the other components of asphalt. The asphaltenes are amphoteric in nature and form aggregates through self-association that offer some viscoelastic behavior to asphalt. Asphaltenes vary in amount and functionality depending on the crude source from which the asphalt is derived. Specific examples of suitable crude asphalts include Ajax, Marathon, Wyoming Sour, Mayan, Venezuelan, Canadian, Arabian, Trinidad Lake, Salamanca and combinations of two or more thereof.

All asphalts containing asphaltenes are suitable for use in the polyepoxy-polymer-linked-asphalt composition described herein. The asphalt can be of low or high asphaltene content. Suitable asphaltene concentrations range from about 0.01 to about 30, about 0.1 to about 15, about 1 to about 10, or about 1 to about 5%, by weight based on the total weight of the asphalt. Suitable low asphaltene concentrations range from about 0.0001 to about 5 weight %, based on the total weight of the asphalt, such that the asphalt can react with the ethylene copolymer but may not react under heating or with acids such as SPA catalyst (see, e.g., U.S. Pat. No. 6,117,926). This choice of co-reactant chemistry is believed to accelerate the reaction between the correct asphalt component and the epoxide-functionalized ethylene copolymer. Suitable high asphaltene asphalts contain more than 7 weight % asphaltenes or more than 10 weight % asphaltenes, based on the total weight of the asphalt. Generally, the asphalts useful in this invention will contain less than 5 weight % oxygen compounds and frequently less than 1 weight % oxygen compounds, again based on the total weight of the asphalt.

Suitable bitumens are advantageously chosen from road-surface bitumens of classes 10/20 to 160/220 and special bitumens of all classes.

Preferably, the bitumen base is present in the PMA at a level of between 90% and 99.4% by weight, more preferably between 94% and 99% by weight, based on the total weight of the polymer/bitumen mixture.

Preferred asphalts have a viscosity at 135° C. of 100 to 10,000 centipoise, preferably 200 to 3,000 centipoise, as measured using the method of AASHTO T316.

Suitable asphalts may also comprise one or more of a sulfonated asphalt, a salt of a sulfonated asphalt (e.g., sodium salt), and an oxidized asphalt. These functionalized asphalts may be present alone or in combination with one or more of the above-described asphalts that are as-isolated from nature.

Finally, suitable asphalts may further comprise one or more random or block copolymers of an aromatic monovinyl hydrocarbon and a conjugated diene and in particular copolymers of styrene and butadiene (SBS) or of styrene and isoprene are particularly effective. Suitable copolymers and methods of combining them with asphalts are described in detail in U.S. Pat. Nos. 5,331,028; 6,087,420; and the references cited therein. SBS is a preferred additional copolymer. Briefly, however, the asphalt preferably includes about 1 to about 12 wt % of these copolymers, based on the total weight of the asphalt and the copolymer.

Epoxy-Functionalized Ethylene Copolymer

The polyepoxy-polymer-linked-asphalt composition further comprises at least one epoxy-functionalized ethylene copolymer. Suitable copolymers include an E/X/Y/Z epoxy-functionalized ethylene copolymer, wherein E represents copolymerized repeat units —(CH$_2$CH$_2$)— derived from ethylene; X represents copolymerized repeat units —(CH$_2$CR$^1$R$^2$)—, wherein R$^1$ is a hydrogen atom or a methyl or ethyl group, and R$^2$ is a carboalkoxy, acyloxy, or alkoxy group of 1 to 10 carbon atoms; Y represents copolymerized repeat units —(CH$_2$CR$^3$R$^4$)—, wherein R$^3$ is a hydrogen atom or a methyl group and R$^4$ is a carboglycidoxy or glycidoxy group; and Z represents copolymerized repeat units derived from one or more additional comonomers.

More specifically, X is derived from copolymerized alkyl acrylates, alkyl methacrylates, vinyl esters, and alkyl vinyl ethers, for example, and the amount of X ranges from 0 to about 40 weight %, based on the total weight of the epoxy-functionalized ethylene copolymer. Y is derived from glycidyl acrylate, glycidyl methacrylate, or glycidyl vinyl ether, for example, and the amount of Y ranges from 0.3 to 15 weight %, based on the total weight of the epoxy-functionalized ethylene copolymer. Finally, the optional additional comonomers Z include, without limitation, carbon monoxide, sulfur dioxide, acrylonitrile, and other monomers known to be capable of copolymerization with ethylene. The amount of Z ranges from 0 to 10 weight %, based on the total weight of the epoxy-functionalized ethylene copolymer. Complementarily, the remainder of the epoxy-functionalized ethylene copolymer consists of copolymerized repeat units —(CH$_2$CH$_2$)— derived from ethylene. The term "complementarily" as used herein refers to a set of values that sums to 100%. In particular, the sum of the weight percentages of E, X, Y and Z in the epoxy-functionalized ethylene copolymer is 100 wt %.

Preferably, the epoxy-functionalized ethylene copolymer is a glycidyl-containing polymer. Suitable glycidyl-containing ethylene copolymers and modified copolymers are well known in the polymer art and can readily be produced by the procedures described in U.S. Pat. No. 4,070,532, for example.

The glycidyl moiety may be represented by the following formula:

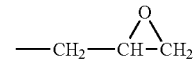

The glycidyl-containing ethylene copolymer comprises, consists essentially of, or consists of repeat units derived from ethylene (E); zero, one or both of the optional comonomers described herein (X and Z); and an epoxy comonomer (Y). Suitable epoxy comonomers include, without limitation, glycidyl esters of acrylic acid or methacrylic acid, glycidyl vinyl ether, and combinations thereof. The epoxy comonomer may be incorporated into the glycidyl-containing ethylene copolymer at a level of from about 0.3 or about 0.5 wt % to about 4, 5, 5.25, 9 or 15 wt %, based on the total weight of the epoxy-functionalized ethylene copolymer. Preferred epoxy comonomers include glycidyl acrylate, glycidyl methacrylate, glycidyl butyl acrylate, glycidyl vinyl ether, for example, and combinations of two or more thereof.

Preferred epoxy-functionalized ethylene copolymers useful in this invention may be represented by the formula: E/X/Y, where E is the copolymer unit —(CH$_2$CH$_2$)— derived from ethylene; X is the copolymer unit —(CH$_2$CR$_1$R$_2$)—, where R$_1$ is hydrogen, methyl, or ethyl, and R$_2$ is carboalkoxy, acyloxy, or alkoxy of 1 to 10 carbon atoms (X for example is derived from alkyl acrylates, alkyl methacrylates, vinyl esters, and alkyl vinyl ethers); and Y is the copolymer unit —(CH$_2$CR$_3$R$_4$)—, where R$_3$ is hydrogen or methyl and R$_4$ is carboglycidoxy or glycidoxy (Y for example is derived from glycidyl acrylate or glycidyl methacrylate). For purposes of this invention the epoxy-containing comonomer unit, Y, may also be derived from vinyl ethers of 1 to 10 carbon atoms (e.g., glycidyl vinyl ether) or mono-epoxy substituted di-olefins of 4 to 12 carbon. The R$_4$ in the above formula includes an internal glycidyl moiety associated with a cycloalkyl monoxide structure; e.g., Y is derived from vinyl cyclohexane monoxide.

In this preferred embodiment, useful weight percentages (based on total weight of E, X, and Y in the copolymer) of the E/X/Y epoxy-functionalized ethylene copolymer units preferably are 0 to about 40 (or when X is present, preferably about 10 to about 40 or about 15 to about 35) weight % of X, about 0.3 (or about 0.5) to about 12 or higher, such as 4, 5, 5.25 or 9 weight % of Y, and the complementary remainder E. Preferably, Y is selected from glycidyl acrylate or glycidyl methacrylate, especially glycidyl methacrylate.

For example, E/GMA is a preferred dipolymer comprising repeat units derived from copolymerization of ethylene and glycidyl methacrylate. Here, the amount of X in the copolymer is 0 weight %.

In preferred E/X/Y terpolymers, X is derived from an ester of unsaturated carboxylic acid such as (meth)acrylate or $C_1$ to $C_8$ alkyl (meth)acrylate, or combinations of two or more such esters. More preferred alkyl (meth)acrylates include iso-butyl acrylate, n-butyl acrylate, iso-octyl acrylate, methyl acrylate and methyl methacrylate.

Notable E/X/Y terpolymers comprise copolymerized units of ethylene, n-butyl acrylate and glycidyl methacrylate (an ENBAGMA copolymer) or copolymerized units of ethylene, methyl acrylate and glycidyl methacrylate (an EMAGMA copolymer).

The epoxy-functionalized ethylene copolymer may optionally include repeat units X derived from a $C_2$ to $C_8$ carboxylic acid ester of an unsaturated alcohol such as vinyl alcohol. A particularly useful vinyl ester is vinyl acetate. A notable E/X/Y terpolymer comprises copolymerized units of ethylene, vinyl acetate and glycidyl methacrylate (an EVAGMA copolymer).

Preferably, the epoxy-containing monomers are incorporated into the epoxy-functionalized ethylene copolymer by the concurrent reaction of monomers ("direct" or "random" copolymerization), rather than by grafting onto the reactant polymer ("graft" copolymerization).

Also preferably, the epoxy-containing polymer has a melt flow index as determined by ASTM D1238-65T, Condition E (190° C./2.16 kg), of about 0.3 to about 2000 grams/10 minutes, more preferably about 1 to about 500 grams/10 minutes.

Finally, the polyepoxy-polymer-linked-asphalt composition comprises about 0.5 to about 10 weight %, preferably from about 0.5 to about 3 or about 5 weight % of the epoxy-functionalized ethylene copolymer, based on the total weight of the polyepoxy-polymer-linked-asphalt composition.

Anhydride

The polyepoxy-polymer-linked-asphalt composition also comprises at least one anhydride. Anhydrides include both linear and cyclic anhydrides.

Linear anhydrides include those of the formula $(RCO)_2O$ wherein R comprises $C_8$-$C_{22}$ alkyl or alkenyl, such as stearic anhydride.

The cyclic anhydride notably comprises a five- or six-member cyclic anhydride structure. Five-member cyclic anhydrides are preferred. The cyclic anhydride may be monocyclic, the only cyclic structure being the cyclic anhydride moiety. Monocyclic anhydrides include glutaric anhydride, succinic anhydride, maleic anhydride, citraconic anhydride, itaconic anhydride and substituted succinic anhydrides such as methyl succinic anhydride, phenyl succinic anhydride, butyl succinic anhydride, 2-octen-1-yl succinic anhydride, dodecenyl succinic anhydride and hexadecyl succinic anhydride. Preferred monocyclic anhydrides include maleic anhydride and substituted succinic anhydrides such as dodecenyl succinic anhydride.

The cyclic anhydride may also be multicyclic, with at least one ring in addition to the cyclic anhydride moiety. The multicyclic anhydride may be aliphatic or aromatic. Aliphatic multicyclic anhydrides include tetrahydrophthalic anhydride, cyclohexane dicarboxylic anhydride and methyl nadic anhydride, preferably cyclohexane dicarboxylic anhydride. Aromatic anhydrides include phthalic anhydride, homophthalic anhydride, pyromellitic dianhydride, trimellitic anhydride, mellitic anhydride, 2,3-naphthoic anhydride and 1,8-naphthoic anhydride, preferably phthalic anhydride, pyromellitic dianhydride and trimellitic anhydride.

Finally, the polyepoxy-polymer-linked-asphalt composition comprises about 0.1 to about 1 weight %, preferably from about 0.1 to about 0.6 weight % of the anhydride, based on the total weight of the polyepoxy-polymer-linked-asphalt composition.

Other Components

The polyepoxy-polymer-linked-asphalt composition may also optionally further comprise one or more of a flux oil, a liquid plasticizer and a hydrogen sulfide scavenger.

Flux oils encompass many types of oils used to modify asphalt and are the final products in crude oil distillation. They are non-volatile oils that are blended with asphalt to soften it. They can be aromatic, such as ValAro from Paulsboro Refining Company, Paulsboro N.J.; paraffinic, such as Hydrolene™ from HollyFrontier Refining & Marketting LLC, Plymouth Meeting Pa.; or mineral such as Hydrobryite™ from Sonneborn, LLC, Parsippany, N.J. Flux oils can also be any renewable-produced vegetable or bio-oil. Blends of two or more such oils are also contemplated.

A liquid plasticizer is an additive that increases the plasticity or fluidity of a material. The major applications are for plastics, such as phthalate esters for improving the flexibility and durability of polymer compositions. Examples of suitable liquid plasticizers include, without limitation, carboxylate esters, for example any dicarboxylic or tricarboxylic ester-based plasticizers, such as bis(2-ethylhexyl) phthalate (DEHP), di-octyl phthalate (DOP), diisononyl phthalate (DINP), and diisodecyl phthalate (DIDP). Suitable liquid plasticizers also include acetic acid esters of monoglycerides made from castor oil; and other nonphthalate plasticizers for PVC including trimellitates, such as tris(2-ethylhexyl) trimellitate, adipates such as bis (2-ethylhexyl) adipate, benzoates such as 1,5-pentanediol dibenzoate, adipic acid polyesters, polyetheresters, and epoxy esters or maleates.

Suitable levels of these materials and methods of incorporating them into the asphalt composition are described in detail in application No. 62/121,078. Briefly, however, the ratio of ethylene copolymer to flux oil or a liquid plasticizer ranges from 20:80 to 95:5, by weight based on the total weight of the ethylene copolymer and the flux oil or liquid plasticizer. In addition, when the flux oil or liquid plasticizer is present, its level is preferably about 0.01 to about 10 weight %, based on the total weight of the based on the total weight of the asphalt composition.

Methods

Polymer-modified asphalts (PMAs) have been typically produced in a high-shear mill process, or in a low-shear mixing process, as is well known to one skilled in the art. For example, the process is dependent on the equipment available, and on the asphalt and polymers used. Polymers that can be used in low-shear mixing equipment can be used in high-shear equipment also. A molten mixture of asphalt and polymer modifiers can be heated at about 160 to about 250° C., or about 170 to 225° C. under a pressure that can accommodate the temperature range, such as atmospheric pressure, for about 1 to about 35 hours, or about 2 to about 30 hours, or about 5 to about 25 hours. The acid or sulfur based catalyst may be added to facilitate reaction between the asphalt and the modifier. The molten mixture can be mixed by, for example, a mechanical agitator or any other suitable mixing means.

Publications IS-200, from the Asphalt Institute of Lexington, Ky., are among the references that describe suitable methods for the commercial production of PMAs.

Further provided herein, however, is a method for preparing a polymer modified asphalt. The method comprises:

(1) providing an epoxy-functionalized ethylene copolymer comprising copolymerized units of ethylene and copolymerized units of an epoxy-containing comonomer;

(2) providing an anhydride; and (3) heating and mixing the polymer and the anhydride with asphalt.

Suitable epoxy-functionalized ethylene copolymers and anhydrides are as described above with respect to the polyepoxy-polymer-linked-asphalt composition. Examples of suitable processes for blending elastomeric polymers with asphalt include those wherein the epoxy-functionalized ethylene copolymer comprises an ethylene vinyl acetate glycidyl methacrylate terpolymer, an ethylene n-butyl acrylate glycidyl methacrylate terpolymer or ethylene methyl acrylate glycidyl methacrylate terpolymer; and those wherein step (3) comprises a) heating the base bitumen or asphalt to 125 to 195° C. or 150 to 195° C. either prior to or after addition to a reactor;

b) adding the copolymer and the anhydride to the heated asphalt in the reactor with stirring for about 1 to 4 hours while maintaining the temperature at about 125 to 195° C. or 150 to about 250° C.

Notably, an acid catalyst is not included in the reaction mixture. Also notably, the asphalt and the polymer mix rapidly in the presence of the anhydride without acid.

In some embodiments, the ethylene copolymer and the anhydride are added to the heated asphalt in separate, sequential steps. The base asphalt can be preheated to 150 to 180° C. or higher in a blending vessel to make it flowable. The ethylene copolymer and anhydride can then be added to the asphalt with stirring at temperatures from 150 to 190° C., such as about 185 to 190° C. It is desirable to heat the materials to the minimum temperature necessary to obtain good processing rates. The ethylene copolymer can be added to the heated asphalt in an amount of about 1 to 10 weight %, based on the total weight of the reaction mixture. The ethylene copolymer can be mixed with the heated asphalt for a period of time such as 10 minutes to one hour, or more, followed by the addition of the anhydride with further mixing. In the context of combining the asphalt and the ethylene copolymer, the terms "mixing" and "reaction" are synonymous and used interchangeably. Mixing and reaction time is asphalt dependent. The mixing and reaction are complete when measured properties no longer change.

The anhydride facilitates blending of the polymer modifier with the asphalt, providing faster mixing times compared to addition of the polymer to the asphalt without the anhydride. For example, improvements in properties such as pass/fail temperature, phase angle and elastic recovery of the polymer-modified asphalt may be obtained within in an hour, within less than an hour, within 15 minutes, or within less than 15 minutes after addition of the anhydride. This mixing time may be significantly faster than the mixing time of the polymer alone with the bitumen to form the PMA. This mixing time may also be faster than the mixing time of the polymer and an acid promoter such as polyphosphoric acid with the bitumen to form the PMA.

Alternatively, the epoxy-functionalized ethylene copolymer and the anhydride in any physical form, such as for example powders or pellets, can be mixed by dry blending, by a conventional masterbatch technique, or by another known process. These mixtures can be heated to a temperature of about 120 to about 250° C., or about 140 to 225° C., or to a molten stage in any suitable vessel, such as a mixing tank, a reactor, or a metal can, to provide a melt-blended composition comprising the copolymer and the anhydride.

In other embodiments, an epoxy-containing ethylene copolymer (ECP) and/or the anhydride can be combined with, or added to, flux oil or a plasticizer as described above by any means known to one skilled in the art to produce a solution or substantially a solution. The composition can be produced by, for example:

(1) dissolving an epoxy-functionalized ethylene copolymer in the flux oil or liquid plasticizer to provide a solution; and (2) mixing the epoxy-functionalized ethylene copolymer solution with asphalt.

The polymer modifier(s) and other optional components can be dissolved in the flux oil or liquid plasticizer by mixing with the oil or plasticizer prior to mixing with the asphalt. To facilitate the formation of a solution, the combination or addition can be mixed by, for example, mechanical means such as stirring. For example, the formation of an ECP solution in oil or plasticizer can be carried out under atmospheric condition, stirring for 10 to 30 minutes at 120 to 150° C. and 700 to 800 RPM. The resulting blend, a solution of polymer modifier in oil or plasticizer, has the consistency of free-flowing oil at elevated temperatures. Additional description of such processes may be found in co-pending U.S. Provisional Patent Appln. No. 62/121,078.

The epoxy-containing ethylene copolymer solution can comprise about 1 to about 99, or about 10 to about 80, or about 20 to about 70, or about 25 to about 60 wt % of an epoxy-containing ethylene copolymer and about 99 to about 1, or about 90 to about 20, or about 80 to about 30, or about 75 to about 40 wt % of one or more flux oil(s) or one or more liquid plasticizer(s), complementarily, based on the total weight of the epoxy-containing ethylene copolymer and the flux oil(s) or liquid plasticizer(s).

The epoxy-functionalized ethylene copolymer solution can be mixed with asphalt. Dispersion of the ethylene copolymer solution into the asphalt may take 10 to 60 minutes, followed by addition of the anhydride with stirring for an additional period of time such as 10 to 60 minutes. One of skill in the art, provided with the guidance herein and more specifically in the Examples below, is capable of determining appropriate mixing conditions, including temperatures, rotor speeds and shear rates.

Suitable uses of the polyepoxy-polymer-linked-asphalt composition described herein include the elastomeric modification of asphalt. The modified asphalt can be used in road pavement compositions, or in roofing materials such as shingles, sheets, or roll products, or in any other application typically using an elastomeric modified asphalt.

Accordingly, the polyepoxy-polymer-linked-asphalt composition described herein can be mixed with aggregates and used for paving. The paving composition has a ratio of about 1 to about 10 or about 5% asphalt and about 90 to about 99 or about 95% aggregates, by weight or by volume. One of ordinary skill is capable of selecting an appropriate parameter and value of the ratio. Mixtures of polymer-modified asphalts with aggregates can be used for paving of highways, city streets, parking lots, ports, airfields, sidewalks, and many more. These mixtures can also be used as a chip seal, emulsions, or other repair product for paved surfaces.

The polyepoxy-polymer-linked-asphalt composition described herein can also be used as a roofing or waterproofing product.

The following examples are provided to describe the invention in further detail. These examples, which set forth specific embodiments and a preferred mode presently contemplated for carrying out the invention, are intended to illustrate and not to limit the invention.

EXAMPLES

Materials

EnBAGMA-1: a terpolymer comprising 70 weight % of copolymerized units of ethylene, 21 weight % of copolymerized units of n-butyl acrylate and 9 weight % of copolymerized units of glycidyl methacrylate, with density of 0.94 g/cc, melting point of 72° C., and melt index of 8 g/10 min as determined by ASTM D1238-65T, Condition E (190° C./2.16 kg).

EEGMA-1: a terpolymer comprising 76 weight % of copolymerized units of ethylene, 15 weight % of copolymerized units of vinyl acetate and 9 weight % of copolymerized units of glycidyl methacrylate, with density of 0.96 g/cc, melting point of 82° C., and melt index of 8 g/10 min.

EEGMA-2: a terpolymer comprising 74.75 weight % of copolymerized units of ethylene, 20 weight % of copolymerized units of vinyl acetate and 5.25 weight % of copolymerized units of glycidyl methacrylate, with density of 0.96 g/cc, melting point of 95° C., and melt index of 12 g/10 min.

EGMA-1: a dipolymer comprising 92.5 weight % of copolymerized units of ethylene and 7.5 weight % of copolymerized units of glycidyl methacrylate, with melt index of 4 g/10 min.

SBS: a styrene/butadiene/styrene block copolymer, such as one available from Kraton Polymers of Houston, Tex., under the tradename Kraton D1101, a linear block copolymer based on styrene and butadiene, believed to include bound styrene of 31% mass.

The acid promoters described below were purchased from Sigma-Aldrich (St. Louis, Mo.).
PPA: polyphosphoric acid, commercial grade.
BTCA: Benzene-1,3,5-tricarboxylic acid (Trimesic acid), commercial grade.
TPHA: Benzene-1,4-dicarboxylic acid (Terephthalic acid), commercial grade.
IPHA: Benzene-1,3-dicarboxylic acid (Isophthalic acid), commercial grade.
CA: Citric acid, commercial grade.
EDTA: ethylenediaminetetraacetic acid, commercial grade.

The anhydride promoters described below were purchased from Sigma-Aldrich (St. Louis, Mo.).
TMA: trimellitic anhydride, commercial grade.
MAH: maleic anhydride, commercial grade.
IAH: itaconic anhydride, commercial grade.
PMDA: pyromellitic dianhydride, commercial grade.

Asphalt samples were obtained from the sources indicated below.

General Procedure for Blending Asphalt and Modifiers

A standard quart can in a heating mantle was used as a vessel for mixing asphalt and modifiers. The can lid was modified to include a center hole sufficient in diameter to accommodate the stirring shaft such that the shaft does not rub on the lid, with minimum open space between the shaft and the lid (approximately 1 cm in diameter), and a hole approximately 30 mm in diameter to allow introduction of a thermocouple probe to monitor the asphalt blend temperature. The stirring shaft was threaded through the lid so that the lid could be sealed on the sample can when the stirring shaft and motor are positioned to mix the sample.

Asphalt samples in 1-gallon cans were heated in a ventilated oven set at 165° C. until they were warm enough to be poured into the blending can. The asphalt sample (300 g) was poured into the blending can and the lid and stirrer assembly were attached. The polymer sample was added and the lid sealed tightly to the can. The asphalt and polymer were mixed for sixty minutes at 185° C. to blend them, then the neat anhydride or neat acid was added, and the mixture stirred for one additional hour to blend in the anhydride. Samples were removed and tested as described below.

The Examples set forth in Table 1 were prepared according to the General Procedure described above using bitumen from PG64 Ajax Asphalt, Detroit, Mich. Comparative example C1 was the base bitumen without additives. Comparative example C2 was the blend of the bitumen with 1.5 weight % of the ethylene copolymer with no promoter added. Comparative examples C3 through C7 included acids as the promoter. Examples 1 through 4 included anhydrides as the promoters. Both the comparative examples and examples each contained 0.5 weight % of the promoter indicated, based on the total weight of the polymer-modified asphalt composition, in addition to the ethylene copolymer modifier.

The properties of the blends were characterized as described below and summarized in Table 1.

Dynamic Shear Rheometer failure temperature and phase angle measurements were performed according to ASSHTO T 315 or ASTM D7175-08 method to determine the Rheological Properties of Asphalt Binder Using a Dynamic Shear Rheometer (DSR). The DSR test method is used to characterize the viscous and elastic behavior of asphalt binders at medium to high temperatures. This characterization is used in the Superpave PG asphalt binder specification, AASHTO PP6. More specifically, the DSR test method is used to determine the dynamic (oscillatory) shear modulus and phase angle of asphalt binders using parallel plate geometry and also to determine the linear viscoelastic properties of asphalt binders as required for specification testing.

The Pass/Fail temperatures are related to the temperature experienced by the pavement in the geographical area for which the asphalt binder is intended to be used. The Pass temperature is determined by a Superpave classification scale (AASHTO PP6) that assigns an asphalt performance grade (PG) at a series of temperatures at intervals of 6° C., for example, 52, 58, 64, 70, 76, 82 or 88° C. The Fail temperature is the actual value at which the modified asphalt fails, specifically, the temperature at which $G^* \sin^{-1} \delta$ is <1 kPa, again determined according to the method of AASHTO PP6.

The phase angle defines the resistance to shear deformation of the asphalt binder in the linear viscoelastic region. The phase angle may depend upon the magnitude of the shear strain. Phase angle for both unmodified and modified asphalt decreases with increasing shear strain.

TABLE 1

| | Modifier | | Promoter | | DSR Fail Temperature (° C.) | Phase Angle (°) |
|---|---|---|---|---|---|---|
| | Name | Weight % | Name | Weight % | | |
| Comparative Example | | | | | | |
| C1 | — | — | — | — | 68.7 | 86.3 |
| C2 | EnBAGMA-1 | 1.5 | — | — | 73.1 | 79.1 |
| C3 | EnBAGMA-1 | 1.5 | BTCA | 0.5 | 76.6 | 74.9 |
| C4 | EnBAGMA-1 | 1.5 | TPHA | 0.5 | 75.0 | 75.4 |
| C5 | EnBAGMA-1 | 1.5 | IPHA | 0.5 | 76.5 | 77.7 |
| C6 | EnBAGMA-1 | 1.5 | EDTA | 0.5 | 74.2 | 77.0 |
| C7 | EnBAGMA-1 | 1.5 | CA | 0.5 | 75.7 | 75.6 |

TABLE 1-continued

|  | Modifier | | Promoter | | DSR Fail Temperature (° C.) | Phase Angle (°) |
| --- | --- | --- | --- | --- | --- | --- |
|  | Name | Weight % | Name | Weight % | | |
| Example | | | | | | |
| 1 | EnBAGMA-1 | 1.5 | TMA | 0.5 | 81.0 | 71.3 |
| 2 | EnBAGMA-1 | 1.5 | PMDA | 0.5 | 82.9 | 73.9 |
| 3 | EnBAGMA-1 | 1.5 | MAH | 0.5 | 80.3 | 71.6 |
| 4 | EnBAGMA-1 | 1.5 | IAH | 0.5 | 77.5 | 74.6 |

The data in Table 1 show that the blend of asphalt with the ENBAGMA modifier without any other additives (Comparative Example C2) provided improved PG grade as indicated by the higher DSR fail temperature and improved (lower) phase angle compared to the base bitumen (Comparative Example C1). Addition of organic acids (Comparative Examples C3 through C7) as cross-link promoters showed greater improvement (higher DSR fail temperature and improved (lower) phase angle) versus Comparative Example C2. Significantly, however, the blends of Examples 1 through 4, comprising various anhydrides, provided performance superior to that of the blends of Comparative Examples C1 to C7 (higher DSR fail temperature and improved (lower) phase angle).

The Examples in Table 2 were prepared according to the General Procedure described above using PG64 Marathon asphalt, Findlay Ohio. Comparative Example 8 was the base bitumen without additives. Comparative Example 9 was the blend of the bitumen with 1.5 weight % of the ethylene copolymer with no promoter added. Examples 5 through 7 included anhydrides as the promoters.

The properties of the blends were characterized as described above, and the resulting data are summarized in Table 2.

TABLE 2

|  | Modifier | | Promoter | | DSR Fail Temperature (° C.) | Phase Angle (°) |
| --- | --- | --- | --- | --- | --- | --- |
|  | Name | Weight % | Name | Weight % | | |
| Comparative Example | | | | | | |
| C8 | — | — | — | — | 67.5 | 86.0 |
| C9 | EnBAGMA-1 | 1.5 | — | — | 70.5 | 82.1 |
| Example | | | | | | |
| 5 | EnBAGMA-1 | 1.5 | TMA | 0.5 | 76.9 | 72.1 |
| 6 | EnBAGMA-1 | 1.5 | PMDA | 0.5 | 92.4 | 70.9 |
| 7 | EnBAGMA-1 | 1.5 | MAH | 0.5 | 76.4 | 74.0 |

The data in Table 2 show that the blend of asphalt with the EnBAGMA modifier without any other additives (Comparative Example C9) provided improved PG grade as indicated by the higher DSR fail temperature and improved (lower) phase angle compared to the base bitumen (Comparative Example C8). Significantly, however, the blends of Examples 5, 6 and 7, comprising various anhydrides, provided performance superior to that of the blends of Comparative Examples C8 and C9 (higher DSR fail temperature and improved (lower) phase angle).

The Examples in Table 3 were prepared according to the General Procedure described above using PG64 Valero asphalt, San Antonio Tex. Comparative Example C10 was the base bitumen without additives. Comparative Example C11 was the blend of the bitumen with 1.5 wt % of the ethylene copolymer with no promoter added. Comparative Example C12 was the blend of the bitumen with 1.5 weight % of the ethylene copolymer with 0.2% PPA added. Examples 8 through 10 included anhydrides as the promoters.

The properties of the blends were characterized as described below and summarized in Table 3.

TABLE 3

| | Modifier | | Promoter | | DSR Fail Temperature (° C.) | Phase Angle (°) |
|---|---|---|---|---|---|---|
| | Name | Weight % | Name | Weight % | | |
| Comparative Example | | | | | | |
| C10 | — | — | — | — | 64.5 | 86.6 |
| C11 | EnBAGMA-1 | 1.5 | — | — | 68.1 | 77.0 |
| C12 | EnBAGMA-1 | 1.5 | PPA | 0.2 | Gelled | |
| Example | | | | | | |
| 8 | EnBAGMA-1 | 1.5 | PMDA | 0.5 | 72.2 | 75.2 |
| 9 | EnBAGMA-1 | 1.5 | MAH | 0.5 | 69.2 | 72.8 |
| 10 | EnBAGMA-1 | 1.5 | TMA | 0.5 | 81.3 | 57.6 |

The data in Table 3 show that the blend of asphalt with the EnBAGMA modifier without any other additives (Comparative Example C11) provided improved PG grade as indicated by the higher DSR fail temperature and improved (lower) phase angle compared to the base bitumen (Comparative Example 10). Comparative Example C12 demonstrated that the PPA promoter caused gelling of the asphalt, rendering it unusable for practical applications. Significantly, however, the blends of Examples 8, 9 and 10, comprising various anhydrides, provided performance superior to that of the blends of Comparative Examples C10, 11 and 12 (higher DSR fail temperature, improved (lower) phase angle, and no gelling).

Comparison of $H_2S$ Emissions

A standard quart can in a heating jacket was used as a vessel for mixing asphalt and modifiers and for measuring $H_2S$ emissions. The can lid was modified to include a center hole sufficient in diameter to accommodate the stirring shaft such that the shaft does not rub on the lid, with minimum open space between the shaft and the lid (approximately 1 cm in diameter), a 64-mm O.D. nipple, for the attachment of a vacuum hose, set sufficiently away from the center hole to not interfere with the shaft, and two holes approximately 30 mm in diameter, one to allow introduction of a thermocouple probe to monitor the asphalt blend temperature and the second to receive a luer lock syringe for the addition of PPA. The stirring shaft was threaded through the lid so that the lid could be sealed on the sample can when the stirring shaft and motor are positioned to mix the sample. A vacuum hose connected the nipple on the lid to a Draeger tube for the analysis of $H_2S$. A vacuum tube connected the Draeger tube to the sparger side of a liquid scrubber assembly containing at least 100 mL 1N NaOH in water. A vacuum tube connected the body side of the liquid scrubber assembly to a vacuum source adjusted to provide a moderate flow of bubbles through the NaOH solution in the liquid scrubber assembly.

All procedures were conducted with good ventilation to minimize exposure to $H_2S$. Asphalt samples (Flint Hills, St. Paul, Minn.) in 1-gallon cans were heated in a ventilated oven set at 165° C. until they were warm enough to be poured into the blending can. The asphalt sample (300 g) was poured into the blending can and the lid and stirrer assembly were attached. The polymer modifier sample was added and the lid sealed tightly to the can. The asphalt and polymer were mixed for sufficient time at 185° C. to blend them, followed by injection of either PPA (Comparative Example 13) or PMDA (Example 9) through the hole in the lid, with continued mixing. $H_2S$ analysis was conducted throughout the procedure by pulling vacuum through the Draeger tube and the scrubber assembly. After mixing was complete, the lid was unsealed and the blended sample was removed for analysis. The absence of residual $H_2S$ could be verified using a portable $H_2S$ monitor, either electronic or Draeger tube.

The amount of $H_2S$ emitted was calculated based on Draeger tubes having a volume of 40% maximum capacity. One ppm of $H_2S$ is 1.42 $mg/m^3$ or 0.000142 mg/100 ml. A fully saturated Draeger tube would correspond to 189.3 ppm of the sample.

The Examples in Table 4 were prepared according to the General Procedure described above for measuring $H_2S$ emissions. Comparative Example C13 was found to emit 71 ppm of $H_2S$ compared to Example 11, which emitted 47 ppm of $H_2S$. Evidently, the blend that included the anhydride provided dramatically lower $H_2S$ emission even when the amount of the anhydride (weight %) was more than twice that of the PPA included in the Comparative Example.

TABLE 4

| | Modifier | | Promoter | | Mixing time (minutes) | | |
|---|---|---|---|---|---|---|---|
| | Name | Weight % | Name | Weight % | After Modifier | After Promoter | $H_2S$ (ppm) |
| Comparative Example | | | | | | | |
| C13 | EEGMA-2 | 2.7 | PPA | 0.2 | 60 | 60 | 71 |
| Example | | | | | | | |
| 11 | EEGMA-2 | 2.7 | PMDA | 0.5 | 60 | 60 | 47 |

The Examples in Table 5 were prepared according to the General Procedure described above using PG64-28 Flint Hills asphalt, St. Paul, Minn., except for the changes noted below. The asphalt samples were supplied as modified from PG58 to PG64 with SBS in an unknown proprietary formulation.

Asphalt samples in 1-gallon cans were heated in a ventilated oven set at 165° C. until they were warm enough to be poured into the blending can. The asphalt sample (300 g) was poured into the blending can and the lid and stirrer assembly were attached. For Comparative Example C15, the sample was stirred for 0.5 hours at 185° C., 0.2% by weight of PPA was added, and the mixture was stirred for an additional 1 hour and sampled for testing. For Example 10, the sample was stirred for 0.5 hours at 185° C., 1% by weight of PMDA was added, and the mixture was stirred for an additional 1 hour and sampled for testing. Comparative Example 14 was the modified bitumen without additives. The properties of the blends were characterized as described below, and the resulting data are summarized in Table 5.

TABLE 5

| | Promoter | | DSR Fail Temperature | Phase Angle |
|---|---|---|---|---|
| | Name | Weight % | (° C.) | (°) |
| Comparative Example | | | | |
| C14 | — | — | 70.1 | 75.2 |
| C15 | PPA | 0.2 | 70.8 | 57.5 |
| Example | | | | |
| 12 | PMDA | 1.0 | 78.9 | 58.2 |

The data in Table 5 show that the mixture of asphalt with the PMDA modifier (Example 12) provided both improved PG grade as indicated by the higher DSR fail temperature and improved (lower) phase angle, compared to the modified sample without additional additives (Comparative Example C14). The PPA-containing sample (Comparative Example C15) did not exhibit an improved PG fail temperature; however, the phase angle was improved (lower value). Significantly, however, the anhydride-containing blend of Example 12 provided performance superior to that of the blends of Comparative Examples C14 and C15 (both higher DSR fail temperature and improved (lower) phase angle).

The Examples in Table 6 were prepared according to the General Procedure described above using PG64 Marathon asphalt, Findlay Ohio except for the changes noted below.

Asphalt samples in 1-gallon cans were heated in a ventilated oven set at 165° C. until they were warm enough to be poured into the blending can. The asphalt sample (300 g) was poured into the blending can and the lid and stirrer assembly were attached. For Comparative Example C12, 1.5% EEGMA-2 was added, the sample was stirred for 1 hour, 0.2% by weight of PPA was added, and the mixture was stirred for an additional 2 hours, then sampled for testing. For Examples 9 through 11, 1.5% EEGMA-2 was added, the sample was stirred for 1 hour, 0.75% by weight of the designated additive was added, the blend was stirred for 1 hour, an additional 0.25% by weight of the designated additive was added, the blend was stirred for an additional 1 hour, a further 0.25% by weight of the designated additive was added, the blend was stirred for 1 hour further, and then it was sampled for testing.

The properties of the blends were characterized as described below and summarized in Table 6.

TABLE 6

| | Modifier | | Promoter | | Viscosity |
|---|---|---|---|---|---|
| | Name | Weight % | Name | Weight % | (cPs) |
| Comparative Example | | | | | |
| C16 | EEGMA-2 | 1.5 | PPA | 0.2 | 2940 |
| Example | | | | | |
| 13 | EEGMA-2 | 1.5 | PMDA | 1.25 | 2367 |
| 14 | EEGMA-2 | 1.5 | TMA | 1.25 | 2167 |
| 15 | EEGMA-2 | 1.5 | MA | 1.25 | 2615 |

The data in Table 6 show that the blend of asphalt with the EnBAGMA modifier with PPA (Comparative Example C16) had a viscosity of 2940 cPs at 135° C. The blends of Examples 13, 14 and 15 have lower viscosities, however, although they include a greater quantity of anhydride than the quantity of PPA in Comparative Example 16.

While certain of the preferred embodiments of this invention have been described and specifically exemplified above, it is not intended that the invention be limited to such embodiments. Various modifications may be made without departing from the scope and spirit of the invention, as set forth in the following claims.

The invention claimed is:

1. A polyepoxy-polymer-linked-asphalt composition comprising
   (a) about 89 to about 99.4 weight % of asphalt;
   (b) about 0.5 to about 10 weight % of an epoxy-functionalized ethylene copolymer, said epoxy-functionalized ethylene copolymer represented by the empirical formula "E/X/Y/Z", wherein E represents copolymerized repeat units of the formula $-(CH_2CH_2)-$ derived from ethylene; X represents copolymerized repeat units of the formula $-(CH_2CR^1R^2)-$, wherein $R^1$ is hydrogen, methyl, or ethyl, and $R^2$ is carboalkoxy, acyloxy, or alkoxy of 1 to 10 carbon atoms; Y represents copolymerized repeat units of the formula $-(CH_2CR^3R^4)-$, wherein $R^3$ is hydrogen or methyl and $R^4$ is carboglycidoxy or glycidoxy; and Z represents copolymerized repeat units derived from one or more additional comonomers; and wherein the amount of X is from 0 to about 40 weight %, the amount of Y is from about 0.3 to about 15 weight %, the amount of Z is from 0 to about 10 weight %, the amount of E is complementary to the amounts of X, Y and Z, and wherein the weight percentages of E, X, Y and Z are based on the total weight of the epoxy-functionalized ethylene copolymer; and
   (c) about 0.1 to about 1 weight % of an anhydride, wherein the anhydride is selected from the group consisting of glutaric anhydride, succinic anhydride, maleic anhydride, citraconic anhydride, itaconic anhydride, a substituted succinic anhydride, tetrahydrophthalic anhydride, cyclohexane dicarboxylic anhydride, methyl nadic anhydride, phthalic anhydride, homophthalic anhydride, pyromellitic dianhydride, trimellitic anhydride, mellitic anhydride, 2,3-naphthoic anhydride, and 1,8-naphthoic anhydride;
   wherein the weight percentages of component (a), component (b) and component (c) are based on the total weight of the polyepoxy-polymer-linked-asphalt composition.

2. The polyepoxy-polymer-linked-asphalt composition of claim 1, comprising about 0.5 to about 3 wt % of the epoxy-functionalized ethylene copolymer.

3. The polyepoxy-polymer-linked-asphalt composition of claim 1, comprising about 0.1 to about 0.6 wt % of the anhydride.

4. The polyepoxy-polymer-linked-asphalt composition of claim 1, wherein the epoxy-containing comonomer Y is selected from the group consisting of glycidyl acrylate, glycidyl methacrylate, glycidyl butyl acrylate, glycidyl vinyl ether, and combinations of two or more of glycidyl acrylate, glycidyl methacrylate, glycidyl butyl acrylate, and glycidyl vinyl ether.

5. The polyepoxy-polymer-linked-asphalt composition of claim 4, wherein the comonomer Y is glycidyl methacrylate.

6. The polyepoxy-polymer-linked-asphalt composition of claim 1, wherein the epoxy-functionalized ethylene copolymer is an ethylene vinyl acetate glycidyl methacrylate terpolymer, an ethylene n-butyl acrylate glycidyl methacrylate terpolymer or an ethylene methyl acrylate glycidyl methacrylate terpolymer.

7. The polyepoxy-polymer-linked-asphalt composition of claim 1, wherein the one or more additional comonomers Z are selected from the group consisting of carbon monoxide, sulfur dioxide and acrylonitrile.

8. The polyepoxy-polymer-linked-asphalt composition of claim 1, wherein the amount of X is from about 15 to about 35 weight %.

9. The polyepoxy-polymer-linked-asphalt composition of claim 1, wherein the amount of Y is from about 5 to about 9 weight %.

10. The composition of claim 1, wherein the substituted succinic anhydride is selected from the group consisting of methyl succinic anhydride, phenyl succinic anhydride, butyl succinic anhydride, 2-octen-1-yl succinic anhydride, dodecenyl succinic anhydride, and hexadecyl succinic anhydride.

11. The polyepoxy-polymer-linked-asphalt composition of claim 1, further comprising one or more of a flux oil, a liquid plasticizer, or a hydrogen sulfide scavenger.

12. The polyepoxy-polymer-linked-asphalt composition of claim 11, wherein the flux oil comprises one or more of an aromatic oil, a paraffinic oil, a mineral oil, or a vegetable oil; and further wherein the liquid plasticizer comprises one or more of a dicarboxylic ester-based plasticizer; a tricarboxylic ester-based plasticizer; or an acetic acid ester of a monoglyceride, a trimellitate, an adipate, a benzoate, an adipic acid polyester, a polyetherester, an epoxy ester, or a maleate.

13. The polyepoxy-polymer-linked-asphalt composition of claim 1, wherein the asphalt comprises one or more random or block copolymers of an aromatic monovinyl hydrocarbon and a conjugated diene.

14. The polyepoxy-polymer-linked-asphalt composition of claim 13, wherein the one or more block copolymers are styrene/butadiene/styrene block copolymers.

15. A road pavement or roofing material comprising the polyepoxy-polymer-linked-asphalt composition of claim 1.

* * * * *